March 27, 1928.
T. H. RODMAN
1,664,185
BRAKING SYSTEM FOR MOTOR DRIVEN MACHINERY
Filed Oct. 25, 1922
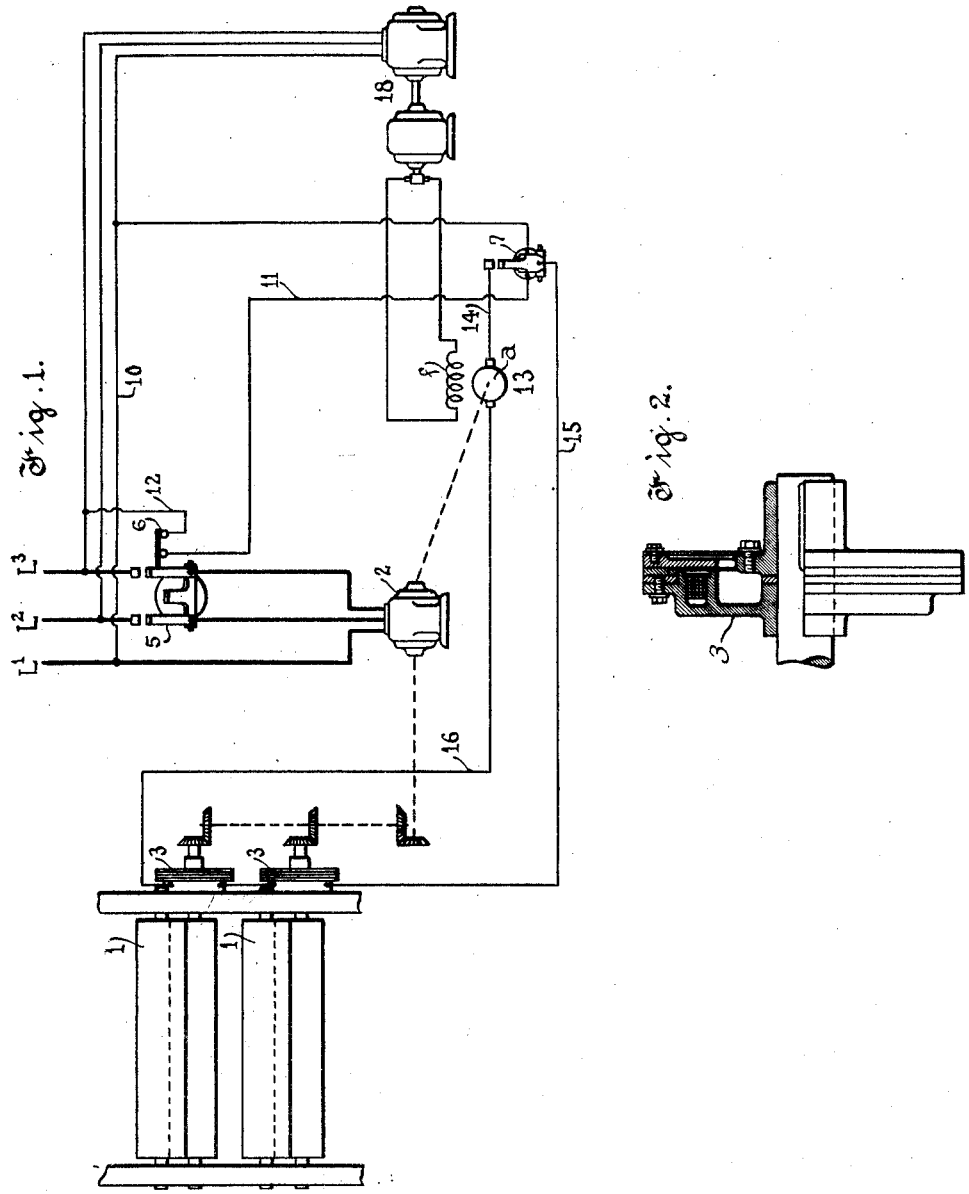
INVENTOR.
Thomas H. Rodman
BY
ATTORNEY.

Patented Mar. 27, 1928.

1,664,185

UNITED STATES PATENT OFFICE.

THOMAS H. RODMAN, OF NEW YORK, N. Y., ASSIGNOR TO THE CUTLER-HAMMER MFG. CO., OF MILWAUKEE, WISCONSIN, A CORPORATION OF WISCONSIN.

BRAKING SYSTEM FOR MOTOR-DRIVEN MACHINERY.

Application filed October 25, 1922. Serial No. 596,706.

This invention relates to braking systems for motor driven machinery operating on alternating current.

While not limited thereto, the invention is particularly applicable to high speed printing presses.

In practice it is very desirable to provide high speed printing presses with braking means exerting a braking force approximately directly proportional to the kinetic energy of the machine for quick and smooth stopping thereof. Also it is highly desirable to render the press when idle free from braking action.

An object of the present invention is to provide a braking system applicable to printing presses and other machinery operating on alternating current which will have the aforementioned desired characteristics.

Another object is to adapt to such machinery the braking system disclosed in the Henderson Patent No. 1,252,902, granted January 8, 1918.

In the system disclosed in the Henderson patent aforementioned, a plurality of electromechanical brakes are provided for different cylinders of the press, said brakes being of the normally released type and being responsive to current generated by the D. C. press drive when disconnected from circuit and driven by the press. Further the brakes are of a type adapted when so energized to subject the press to a braking force approximately directly proportional to the kinetic energy of the press and according to the present invention it is preferred to employ similar brakes and to provide a supply of direct current simulating that afforded by the driving machine in such former system.

One embodiment of the present invention is diagrammatically illustrated in the accompanying drawing and the same will now be described it being understood that the embodiment illustrated is susceptible of various modifications without departing from the scope of the appended claims.

In the accompanying drawing,

Figure 1 is a diagrammatic view of the braking system; and

Fig. 2 is a sectional view of a preferred form of electromagnetic brake.

Referring to the drawing the same illustrates a printing press of the deck type having a plurality of couplets 1 to be driven by an A. C. motor 2 and to be braked by individual electromagnetic brakes 3 preferably of the type shown in Fig. 2. It is to be understood that the printing press couplets 1 and motor 2 are merely shown as typical of any desired machine and drive therefor and that the brakes 3 need not be of the specific type illustrated. As will be understood a brake of the type illustrated may be designed for a braking effect thereof approximately directly proportional to the square of the current supplied thereto and the brake is preferably so designed.

The motor 2 is shown as supplied with current from an A. C. line $L'$, $L^2$, $L^3$ through an electromagnetic switch 5 to be controlled in any suitable manner, said switch having auxiliary contacts 6 to complete the energizing circuit of a relay 7 when the motor 2 is disconnected from circuit. The energizing circuit for relay 7 extends from line $L'$ by conductor 10 through the winding of said relay by conductor 11 to and through the contacts 6 of switch 5 when said switch is open by conductor 12 to line $L^3$.

The relay 7 which is of the normally open type controls the continuity of circuit between the windings of brakes 3 and a supply generator 13 therefor, the latter having its armature $a$ driven by motor 2 or directly by the machine 1 as preferred. As will be observed a circuit extends from the right hand terminal of the generator 13 by conductor 14 through relay 7 by conductor 15 to and through the brake windings in series by conductor 16 to the left hand terminal of the generator.

The generator 13 is separately excited, its field $f$ being supplied by a small motor generator set 18 supplied with current from the A. C. line $L'$, $L^2$, $L^3$. Hence the voltage output of the generator 13 is rendered approximately directly proportional to the speed of motor 2.

Thus assuming operation of motor 2 to drive machine 1 release of switch 5 to disconnect motor 2 from the circuit will energize relay 7 to subject the windings of brakes 3 to a direct current whose voltage is approximately directly proportional to the speed of motor 2 and machine 1. This current closely simulates the braking current of the Henderson system aforementioned and accordingly causes the brakes to apply with an effect approximately directly proportional to the kinetic energy of the machine. Moreover, when the machine 1 and motor 2 are brought to rest the generator 13 is arrested thereby terminating the supply of current to the brakes and consequently effecting release of the brakes.

What I claim as new and desire to secure by Letters Patent is:

1. In a braking system for motor driven machines operating on alternating current in combination direct current braking means to produce a braking effect approximately proportional to the square of the current supplied thereto and means to supply said braking means with direct current whose voltage is approximately directly proportional to the speed of said machine.

2. In a braking system for motor driven machines operating on alternating current in combination direct current braking means to produce a braking effect approximately proportional to the square of the current supplied thereto and a supply generator for said brake which is driven by said machine and which has means to separately excite its field.

3. In a braking system for motor driven machines operating on alternating current, in combination, direct current electro-mechanical braking means to produce a braking effect approximately proportional to the square of the current supplied thereto, and means to supply said braking means with direct current whose voltage is approximately proportional to the speed of said machine.

In witness whereof, I have hereunto subscribed my name.

THOMAS H. RODMAN.